(12) United States Patent
Taguchi

(10) Patent No.: US 8,338,755 B2
(45) Date of Patent: Dec. 25, 2012

(54) ON-VEHICLE HEATER AND ITS MANUFACTURING METHOD

(76) Inventor: Koshiro Taguchi, Kanagawa-ken (JP)

(*) Notice: Subject to any disclaimer, the term of this patent is extended or adjusted under 35 U.S.C. 154(b) by 242 days.

(21) Appl. No.: 12/747,928

(22) PCT Filed: Jan. 30, 2008

(86) PCT No.: PCT/JP2008/051379
§ 371 (c)(1),
(2), (4) Date: Jun. 14, 2010

(87) PCT Pub. No.: WO2009/096007
PCT Pub. Date: Aug. 6, 2009

(65) Prior Publication Data
US 2010/0282729 A1    Nov. 11, 2010

(51) Int. Cl.
*B60L 1/02* (2006.01)
(52) U.S. Cl. .................... 219/202; 219/478
(58) Field of Classification Search ............ 219/202
See application file for complete search history.

(56) References Cited

U.S. PATENT DOCUMENTS

| | | | | |
|---|---|---|---|---|
| 5,804,797 A | * | 9/1998 | Kaimoto et al. | 219/505 |
| 2006/0273078 A1 | * | 12/2006 | Hong | 219/202 |

FOREIGN PATENT DOCUMENTS

| | | | |
|---|---|---|---|
| EP | 1528838 | A2 | 5/2005 |
| FR | 2803370 | A3 | 7/2001 |
| JP | 05-169967 | A | 7/1993 |
| JP | 2002-050458 | A | 2/2002 |
| JP | 2006-327574 | A | 12/2006 |
| JP | 2007-125967 | A | 5/2007 |
| JP | 2007-128720 | A | 5/2007 |
| WO | 2005/049350 | A1 | 6/2005 |
| WO | 2006/123915 | A1 | 11/2006 |

OTHER PUBLICATIONS

European Supplemental Search Report for 08 71 0638 dated Oct. 25, 2011.
International Search Report for PCT/JP2008/051379 dated Apr. 15, 2008.
Korean Office action for 10-2010-7013107 dated Aug. 25, 2011.

* cited by examiner

*Primary Examiner* — Kenneth Parker
*Assistant Examiner* — Dale E Page
(74) *Attorney, Agent, or Firm* — Pearne & Gordon LLP

(57) ABSTRACT

An on-vehicle heater according to the invention includes: a heating body unit including a heater element; an electrode member overlapped in contact with the heater element; an insulating sheet enveloping the heater element and the electrode member; and a tube housing the heater element and the electrode member enveloped in the insulating sheet; a radiator unit stacked on the heating body unit; and a cap mounted on an end portion of the heating body unit, the electrode member having a terminal portion being led out of the tube from an end opening of the tube, bent to pass through the cap, and led out of the cap.

7 Claims, 9 Drawing Sheets

ON-VEHICLE HEATER AND ITS MANUFACTURING METHOD

TECHNICAL FIELD

This invention relates to an on-vehicle heater to be installed in an automobile, and particularly to an on-vehicle heater employing a PTC (Positive Temperature Coefficient) element as a heat source.

BACKGROUND ART

In general, a hot-water heater, which heats air by using waste heat of engine cooling water, is used as a main heat source for heating an automobile interior. However, because of facts such as that the temperature of the engine cooling water is low at engine start, an electric heater is also provided as an auxiliary heat source. Further, it seems that, in the future, more electric heaters will be installed as electric vehicles will become widespread.

A PTC element is often used as a heating body in an electric heater (e.g., Patent Literature 1). A PTC heater disclosed in Patent Literature 1 has a structure including two heater units stacked on each other. In each of the heater units, fins are disposed above and below a PTC element, and electrode members are provided in contact with the fins.

[Patent Literature 1] Japanese Patent Application Publication No. H5-169967

DISCLOSURE OF INVENTION

Technical Problem

The heater disclosed in Patent Literature 1 has a structure in which the electrode members, the fins, and the PTC elements are electrically connected and in which these current-carrying portions are exposed. In particular, in the case where outside air is taken in to be sent to the heater, an electrical leakage may occur when water is sent to the heater in a raining or snowing environment. Moreover, heaters to be installed in vehicles are required to have the capability of withstanding vibrations during a drive.

The invention has been made in view of the above-described problems and provides an on-vehicle heater, which is excellent in vibration resistance and water resistance required for installation in vehicles.

Technical Solution

According to an aspect of the invention, there is provided an on-vehicle heater including: a heating body unit including: a heater element; an electrode member overlapped in contact with the heater element; an insulating sheet enveloping the heater element and the electrode member; and a tube housing the heater element and the electrode member enveloped in the insulating sheet; a radiator unit stacked on the heating body unit; and a cap mounted on an end portion of the heating body unit, the electrode member having a terminal portion being led out of the tube from an end opening of the tube, bent to pass through the cap, and led out of the cap.

According to another aspect of the invention, there is provided a method for manufacturing an on-vehicle heater, including: stacking a heating body unit and a radiator unit, the heating body unit including a heater element, an electrode member overlapped in contact with the heater element, an insulating sheet enveloping the heater element and the electrode member, and a tube housing the heater element and the electrode member enveloped in the insulating sheet; filling a first encapsulating material having electrical insulation and water resistance in an interior of the tube in a vicinity of an end opening, a terminal portion of the electrode member being led out from the end opening of the tube; after the first encapsulating material being cured, bending the terminal portion and mounting an inner cap on a bent portion of the terminal portion; and mounting an outer cap having a second encapsulating material applied to an interior of the outer cap on the inner cap to cover a tip of the terminal portion protruding from the inner cap with the second encapsulating material, the second encapsulating material having electrical insulation and water resistance.

EXPLANATION OF REFERENCE

| | |
|---|---|
| 3 | heating body unit |
| 4 | radiator unit |
| 5 | heater unit |
| 6 | first inner cap |
| 7 | second inner cap |
| 8 | outer cap |
| 11 | tube |
| 15 | insulating sheet |
| 20 | heater element |
| 21 | fin |
| 40a, 40b | electrode member |
| 42a, 42b | terminal portion |
| 50 | cable |
| 71 to 73 | encapsulating material |

BEST MODE FOR CARRYING OUT THE INVENTION

Hereinafter, an embodiment of the invention will be described with reference to the drawings.

Figure 1:
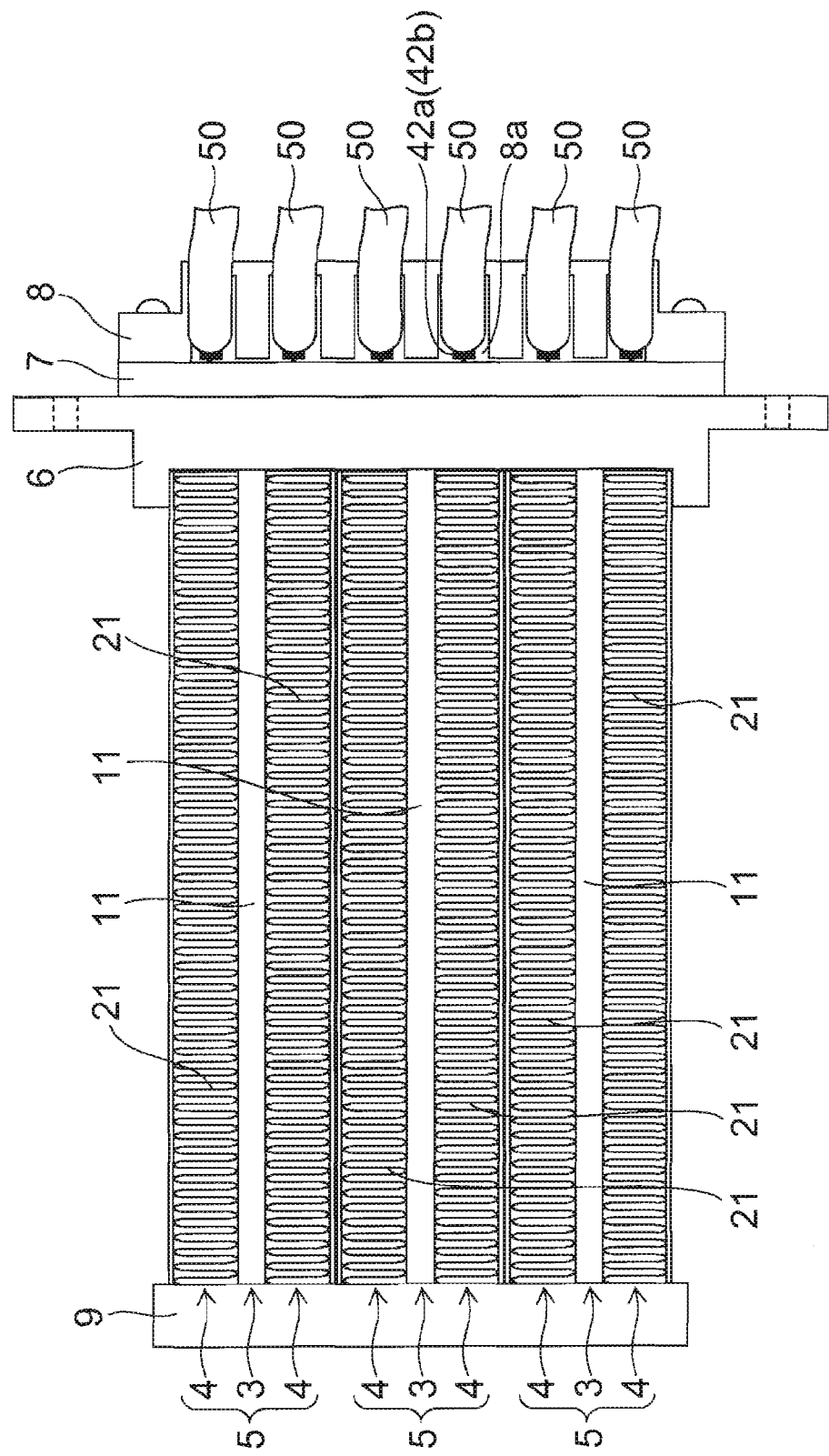
FIG. 1 is a plan view of an on-vehicle heater according to an embodiment of the invention.

FIG. 1 is a plan view of an on-vehicle heater according to the embodiment of the invention.

The on-vehicle heater according to this embodiment has a structure in which multiple heating body units 3 and multiple radiator units 4 are stacked. Each of the heating body units 3 including a heater element housed in a tube 11, and each of the radiator units 4 including a fin 21. For example, one heater unit 5 is formed by sandwiching one heating body unit 3 between two radiator units 4.

Figure 2:
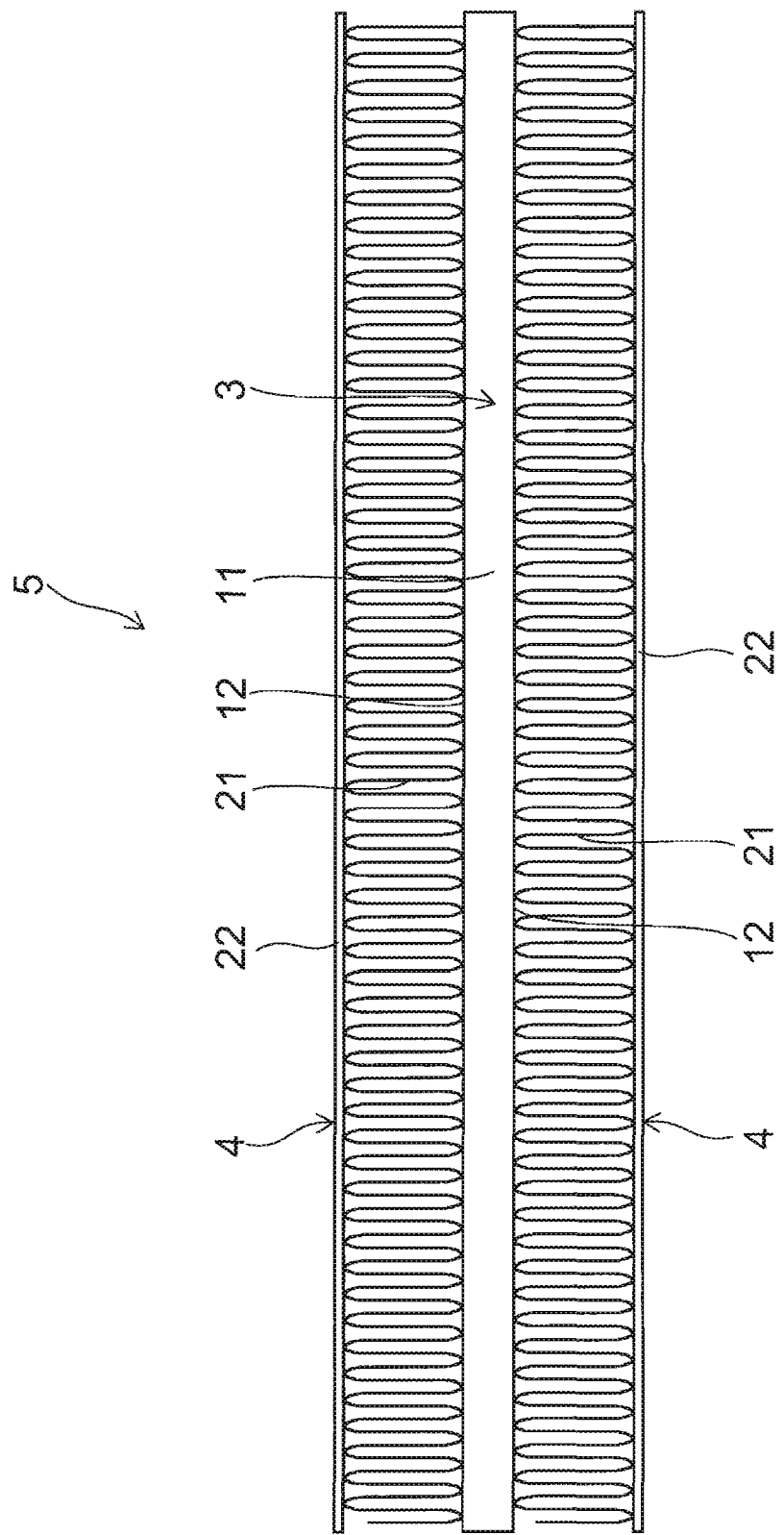
FIG. 2 is an enlarged plan view extracting one heater unit in FIG. 1.

The on-vehicle heater according to this embodiment has a structure obtained by stacking three heater units 5, for example. FIG. 2 is an enlarged view showing one heater unit 5 extracted.

Each of the radiator units 4 includes the fin 21 and a metal plate 22. The fin 21 is formed by bending a plate material made of, for example, aluminum into a zigzag shape, and is provided between the metal plate 22 and the tube 11 of the heating body unit 3.

Figure 3:
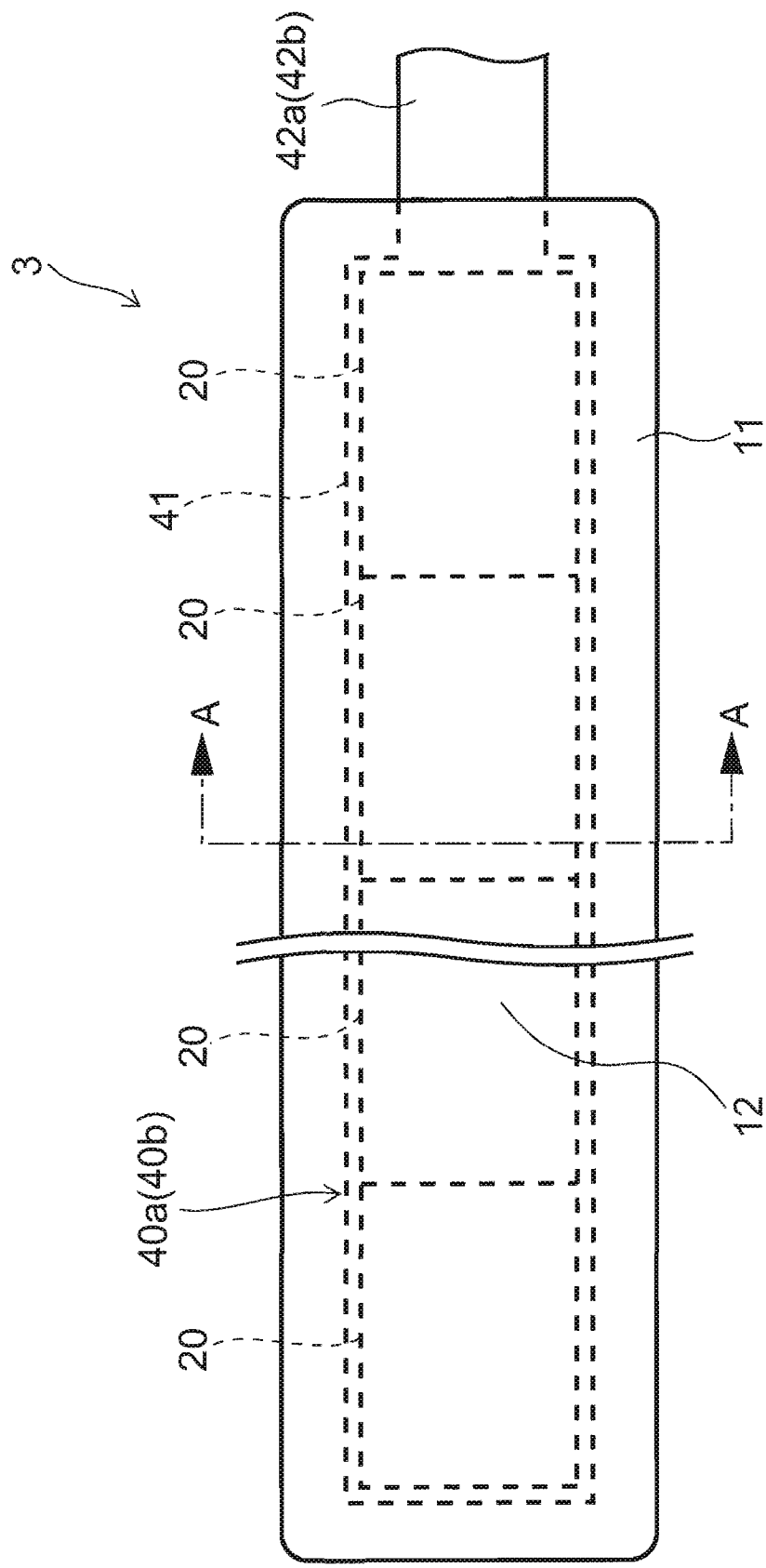
FIG. 3 is a plan view of a heating body unit of the heater unit.

FIG. 3 is a plan view of the heating body unit 3.

Figure 4:
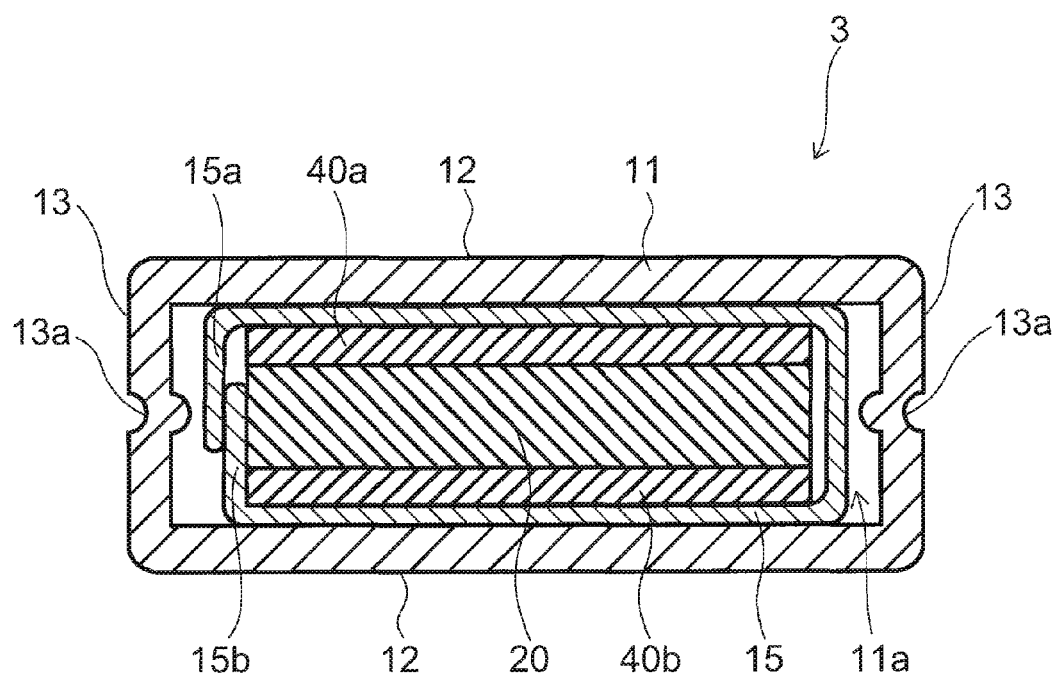
FIG. 4 is an enlarged cross-sectional view taken along line A-A in FIG. 3.

FIG. 4 is an enlarged cross-sectional view taken along line A-A in FIG. 3.

The heating body unit 3 includes heater elements 20, a pair of electrode members 40*a* and 40*b* provided such that the heater elements 20 are sandwiched therebetween, an insulating sheet 15 enveloping the heater elements 20 and the electrode members 40*a* and 40*b*, and the tube 11 which houses therein the heater elements 20 and the electrode members 40*a* and 40*b* enveloped in the insulating sheet 15.

Each of the heater elements 20 is a PTC (Positive Temperature Coefficient) ceramic element having positive temperature characteristics. When the temperature rises to the Curie point or more, the resistance of the heater element 20 sharply increases, and a further temperature rise is limited. As indicated by dotted lines in FIG. 3, the multiple heater elements 20 are disposed in the longitudinal direction of the tube 11. Each of the heater elements 20 is formed in the form of, for example, a thin rectangular plate piece. On each of front and back surfaces of the heater element 20 which have larger areas than the other surfaces, an electrode plane made of metal, e.g., silver, aluminum, or the like, is formed. On both of the electrode planes of the heater elements 20, the electrode members 40*a* and 40*b* are laid in contact therewith, respectively. Voltages of opposite polarities are applied to the electrode members 40*a* and 40*b*, respectively.

The electrode member 40*a* is made of metal, e.g., aluminum or the like, and has a strip-shaped flat plate portion 41 and a terminal portion 42*a* integrally provided at one end of the flat plate portion 41. The other electrode member 40*b* is also made of metal, e.g., aluminum or the like, and has a strip-shaped flat plate portion 41 and a terminal portion 42*b* integrally provided at one end of the flat plate portion 41.

The flat plate portions 41 are laid on the electrode planes of the heater elements 20 in contact therewith. Each of the flat plate portions 41 and each of the electrode planes of the heater elements 20 are bonded to each other with a high-thermal-conductivity adhesive, e.g., a silicone adhesive.

The electrode planes of the heater elements 20 are formed by, for example, depositing aluminum by thermal spraying, or applying silver and then depositing aluminum by thermal spraying. Accordingly, fine irregularities are formed on the surfaces of the electrode planes. Thus, even in a case where the adhesive for bonding the heater elements 20 and the flat plate portions 41 of the electrode members is insulative, protrusions of the irregularities on the surfaces of the electrode planes pass through the adhesive to come into contact with the flat plate portions 41. In this way, the electrical continuity between the heater elements 20 and the electrode members is ensured.

The respective terminal portions 42*a* and 42*b* of the electrode members 40*a* and 40*b* protrude outside the tube 11 from an end opening of the tube 11 at one end thereof.

As shown in FIG. 4, the electrode members 40*a* and 40*b* and the heater elements 20 sandwiched therebetween are enveloped in the insulating sheet 15. The insulating sheet 15 is flexible, thermally conductive, and electrically insulative and made of, for example, a polyimide film. Both end portions 15*a* and 15*b* of the insulating sheet 15 are overlapped with each other. Thus, the insulating sheet 15 completely covers other portions of the heater elements 20 and the electrode members 40*a* and 40*b* than both ends thereof. The both end portions 15*a* and 15*b* of the insulating sheet 15 overlap each other not on the electrode members 40*a* and 40*b* but at a portion facing side surfaces of the heater elements 20 and the electrode members 40*a* and 40*b*. In other words, the both end portions 15*a* and 15*b* of the insulating sheet 15 overlap each other not behind radiating surfaces 12 of the tube 11 but behind side surfaces 13 thereof.

The tube 11 is formed in the form of a rectangular tube having the pair of radiating surfaces 12 facing each other and the pair of side surfaces 13, which are formed approximately perpendicular to the radiating surfaces 12 and face each other. The radiating surfaces 12 have larger widths and areas than the side surfaces 13. The tube 11 is made of a thermally conductive and easy-to-process material, e.g., aluminum or the like.

The heater elements 20 and the electrode members 40*a* and 40*b* are housed in a hollow portion 11*a* of the tube 11 in a state in which other portions of the heater elements 20 and the electrode members 40*a* and 40*b* than both ends thereof are covered with (enveloped in) the insulating sheet 15. The tube 11 has openings only at both ends thereof. The hollow portion 11*a* can communicate with the outside only through these openings.

The electrode planes of the heater elements 20 face the back sides of the radiating surfaces 12 of the tube 11. Between each of the electrode planes and the corresponding one of the back sides of the radiating surfaces 12, the electrode member 40*a* or 40*b* and the insulating sheet 15 are interposed. Inside dimensions (vertical dimensions in FIG. 4) of the tube 11 before assembly are slightly larger than those of the tube 11 shown in FIG. 4. Then, a structure in which the heater elements 20 and the electrode members 40*a* and 40*b* are assembled together and enveloped in the insulating sheet 15 is inserted into the tube 11, and mechanical pressure is applied to the radiating surfaces 12 of the tube 11 to press the tube 11 in the vertical direction of FIG. 4. Thereby, the heater elements 20, the electrode members 40*a* and 40*b*, and the insulating sheet 15 become tightly sandwiched between the back sides of the pair of radiating surfaces 12 of the tube 11 and are thus fixed in the hollow portion 11*a*.

The amount by which the tube 11 is pressed as described above is approximately 0.5 mm, for example. In this respect, as shown in FIG. 4, grooves 13*a* are formed in the both side surfaces 13 of the tube 11 in the longitudinal direction, respectively. This can prevent the side surfaces 13 from bulging out (prevent outside dimensions from increasing) when the tube 11 is pressed. Since the side surfaces 13 of the tube 11 do not become convex surfaces, it is easy to attach a temperature sensor, e.g., a thermocouple or the like, to the side surfaces 13. Also, the temperature sensor is stabilized after being attached thereto.

As shown in FIG. 2, the metal plates 22 of the radiator units 4 are disposed approximately parallel to the radiating surfaces 12 of the tube 11 to face each other. The fins 21 are provided between each of the metal plates 22 and the corresponding one of the radiating surfaces 12.

Each of the metal plates 22 is formed in the form of a thin plate having a flat surface with an area approximately equal to those of the radiating surfaces 12, and is made of a high-thermal-conductivity metal, e.g., aluminum or the like. The metal plate 22 and the fin 21 are bonded and fixed to each other with a high-heat-resistance and high-thermal-conductivity adhesive, e.g., a silicone adhesive. The fin 21 and the radiating surface 12 are also bonded and fixed to each other with a high-heat-resistance and high-thermal-conductivity adhesive, e.g., a silicone adhesive.

Further, by bonding the metal plate 22 to the metal plate 22 of another heater unit 5 with a high-heat-resistance and high-thermal-conductivity adhesive, e.g., a silicone adhesive, a structure is obtained in which multiple (three in the shown example) heater units 5 are stacked on each other as shown in FIG. 1.

This stacked structure has three caps 6 to 8 mounted on one end thereof and a cap 9 mounted on the other end thereof. The hollow portion of the tube 11 is closed with these caps 6 to 9. Each of the caps 6, 7, 8, and 9 is made of a heat-resistant and electrically-insulating resin material.

A method of mounting the caps 6 to 8 at the one end will be described with reference to FIGS. 6 to 10.

Figure 6:
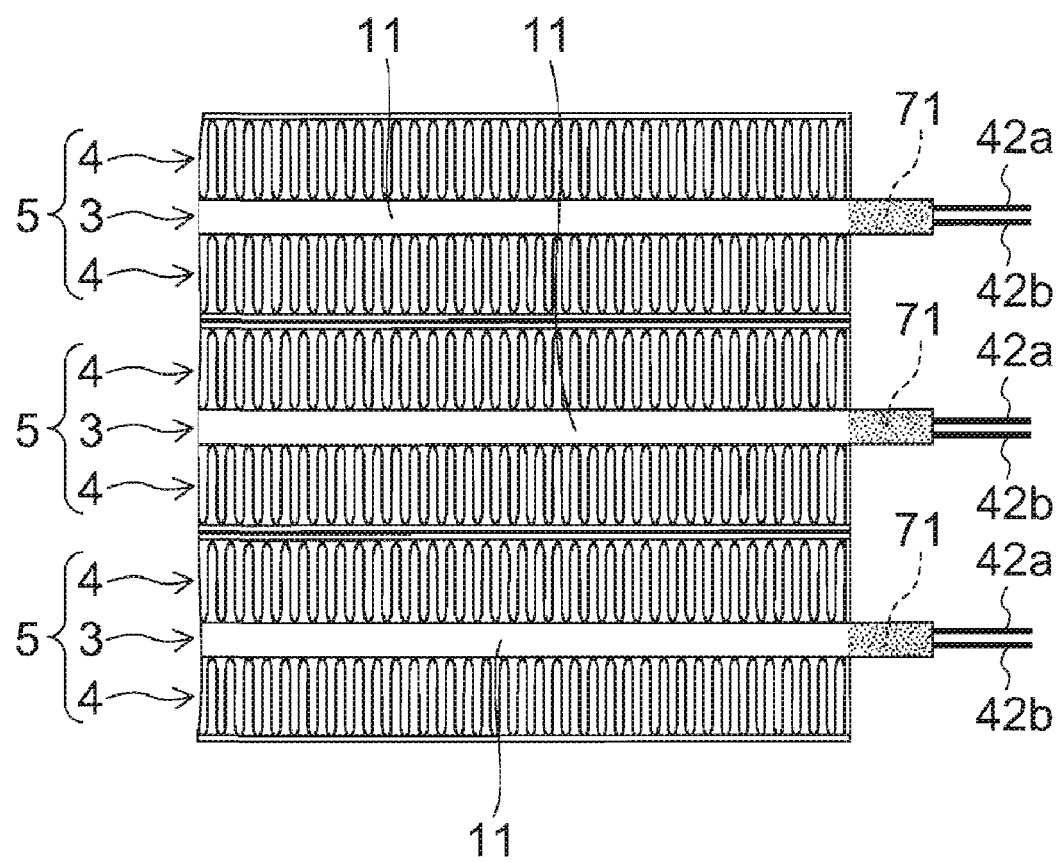
FIG. 6 is a schematic view showing a vicinity of electrode member terminal portions in an on-vehicle heater according to an embodiment of the invention before caps are mounted.

FIG. 6 shows the vicinity of lead portions of the terminal portions 42a and 42b in a stacked structure of multiple (e.g., three) heater units 5 before the caps 6 to 8 are mounted.

One end portions of the pair of electrode members 40a and 40b of each heater unit 5 function as the terminal portions 42a and 42b responsible for electrical connection to the outside, and are led out of the tube 11 from the end opening of the tube 11 at one end thereof. The terminal portions 42a and 42b are separated from each other and not in contact with each other (not short-circuited). One of the terminal portions 42a and 42b is connected to a power line, and the other is connected to a ground line.

Before cap mounting, an electrically-insulating and water-resistant encapsulating material 71 made of, for example, a silicone resin is introduced into inner spaces of the tubes 11 through the end openings on the side from which the terminal portions 42a and 42b are led to the outside. Thus, the inner spaces of the tubes 11 in the vicinities of the end openings are filled with the encapsulating material 71 to close the end openings.

Figure 7:
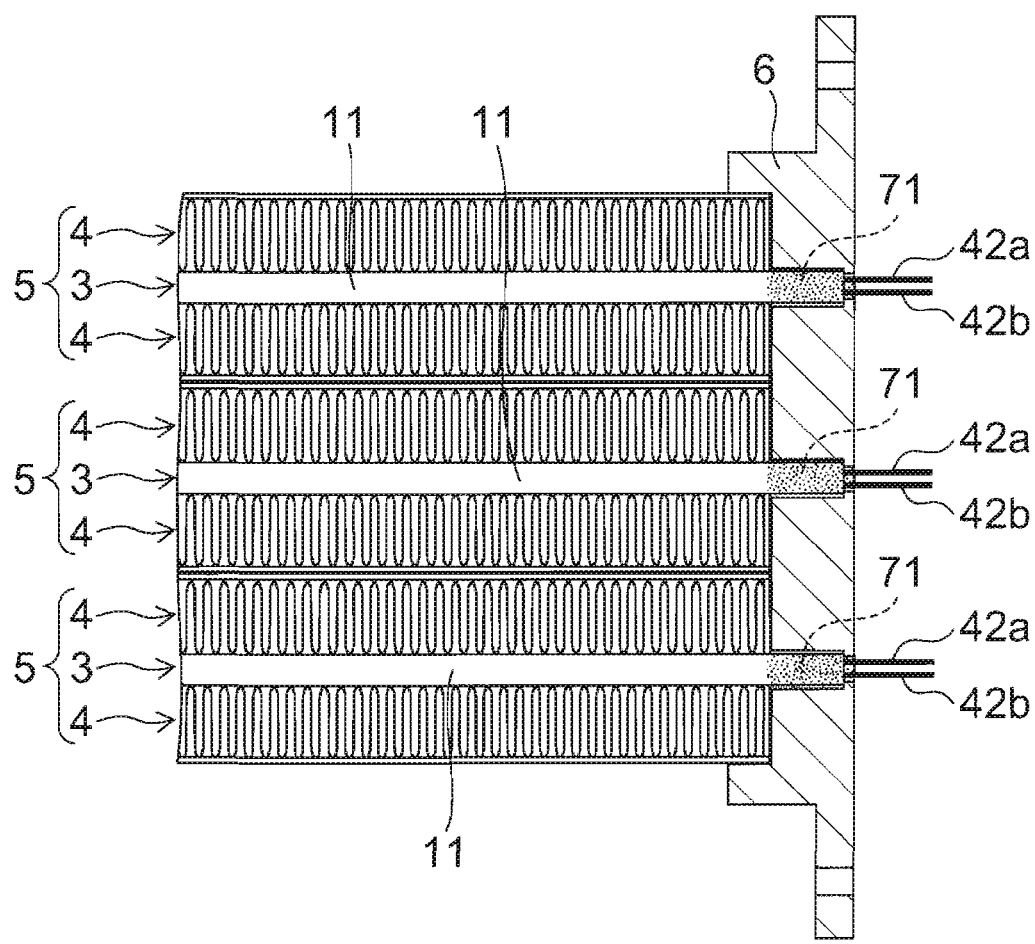
FIG. 7 is a schematic view showing a state in which a first inner cap is mounted with respect to the state of FIG. 6.

After being filled, the encapsulating material 71 is sufficiently dried and cured. Then, as shown in FIG. 7, a first inner cap 6 is mounted on one end portions of the heater units 5. The first inner cap 6 is bonded and fixed to the one end portions of the heater units 5 with a heat resistant adhesive.

One end portions of the heating body units 3 protrude from one end portions of the radiator units 4. The one end portions of the radiator units 4 are fitted into recessed portions formed in the first inner cap 6. The one end portions of the heating body units 3 are inserted into through-holes which are formed in the first inner cap 6 so as to pass through the first inner cap 6 from bottoms of the recessed portions to the opposite end face of the first inner cap 6. The terminal portions 42a and 42b pass through the through-holes of the first inner cap 6 to protrude outside the first inner cap 6.

Figure 8:
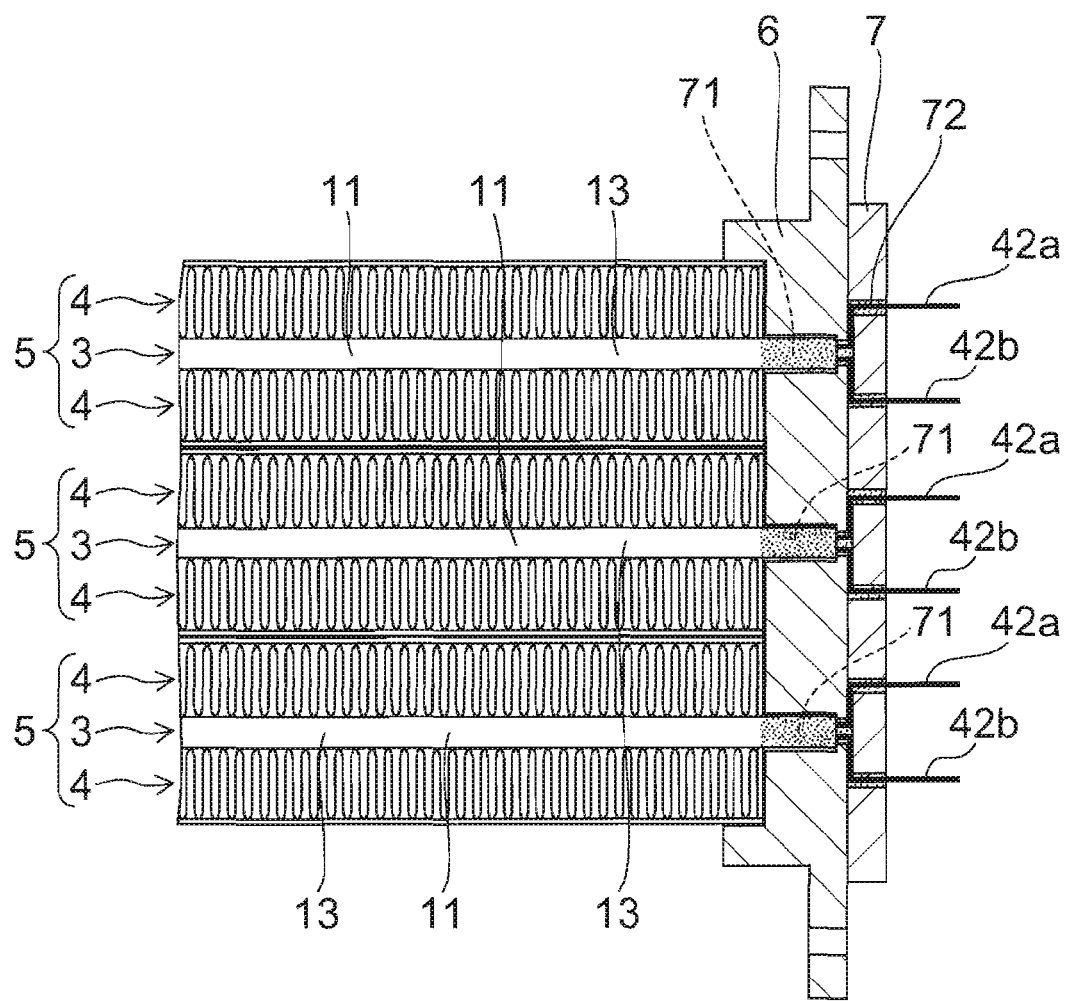
FIG. 8 is a schematic view showing a state in which a second inner cap is mounted with respect to the state of FIG. 7.

Subsequently, as shown in FIG. 8, the terminal portions 42a and 42b are bent, and then a second inner cap 7 is mounted on the first inner cap 6 with, for example, an adhesive to cover the bent portions. Portions of the terminal portions 42a and 42b which are close to the end openings of the tubes 11 are bent, and tip-side portions thereof pass through through-holes formed in the second inner cap 7 to protrude outside the second inner cap 7.

Each of the terminal portions 42a and 42b is bent in a way that a portion of the corresponding one of the terminal portion 42a and 42b in a vicinity of the end opening of the tube 11 forms an approximately right angle with a portion of the corresponding one of the terminal portion 42a and 42b passing through an inside of the second inner cap 7. The pair of terminal portions 42a and 42b included in each of the heating body units 3 are bent so as to separate from each other or to widen a space between each other in the stacking direction (vertical direction in the drawing plane of FIG. 8) of the multiple heating body units 3 and the multiple radiator units 4. Further, portions of the pair of terminal portions 42a and 42b which are closer to the tips thereof are bent outward (to the right in FIG. 8) at approximately right angles to pass through the through-holes formed in the second inner cap 7 in the thickness direction thereof. The distance between portions of the pair of terminal portions 42a and 42b included in each of the heating body units 3 which pass through the inside of the second inner cap 7 to protrude outward is larger than the distance by which the pair of electrode members 40a and 40b face each other with the heater elements 20 interposed therebetween as described previously with reference to FIG. 4, and also larger than the widths (widths in the direction of the shorter dimension) of the side surfaces 13 of the tube 11. Multiple (e.g., six in this embodiment) terminal portions 42a and 42b are evenly located in dispersed positions as viewed in the longitudinal direction of the second inner cap 7.

It should be noted that before the second inner cap 7 is mounted, an electrically-insulating and water-resistant encapsulating material 72 is applied in advance to portions of the terminal portions 42a and 42b which extend from portions thereof in the vicinities of the end openings of the tubes 11 via the bent portions thereof to portions thereof to be housed in the second inner cap 7. The terminal portions 42a and 42b having the encapsulating material 72 applied thereto are passed through the second inner cap 7, and then the second inner cap 7 is mounted.

Thereby, a structure is obtained in which the encapsulating materials 72 and 71 fill from the through-holes of the second inner cap 7 to the inner spaces of the tubes 11 in the vicinities of the end openings thereof. In other words, lead paths for the terminal portions 42a and 42b extending from the inner spaces of the tubes 11 in the vicinities of the end openings thereof to the through-holes of the second inner cap 7 are sealed with the encapsulating materials 71 and 72, and thus portions of the terminal portions 42a and 42b enclosed with the lead paths are covered and waterproof-sealed with the encapsulating materials 71 and 72.

The tip portions of the terminal portions 42a and 42b which protrude outside the second inner cap 7 are electrically connected to cables 50 shown in FIG. 1 via connecting members.

Figure 5:
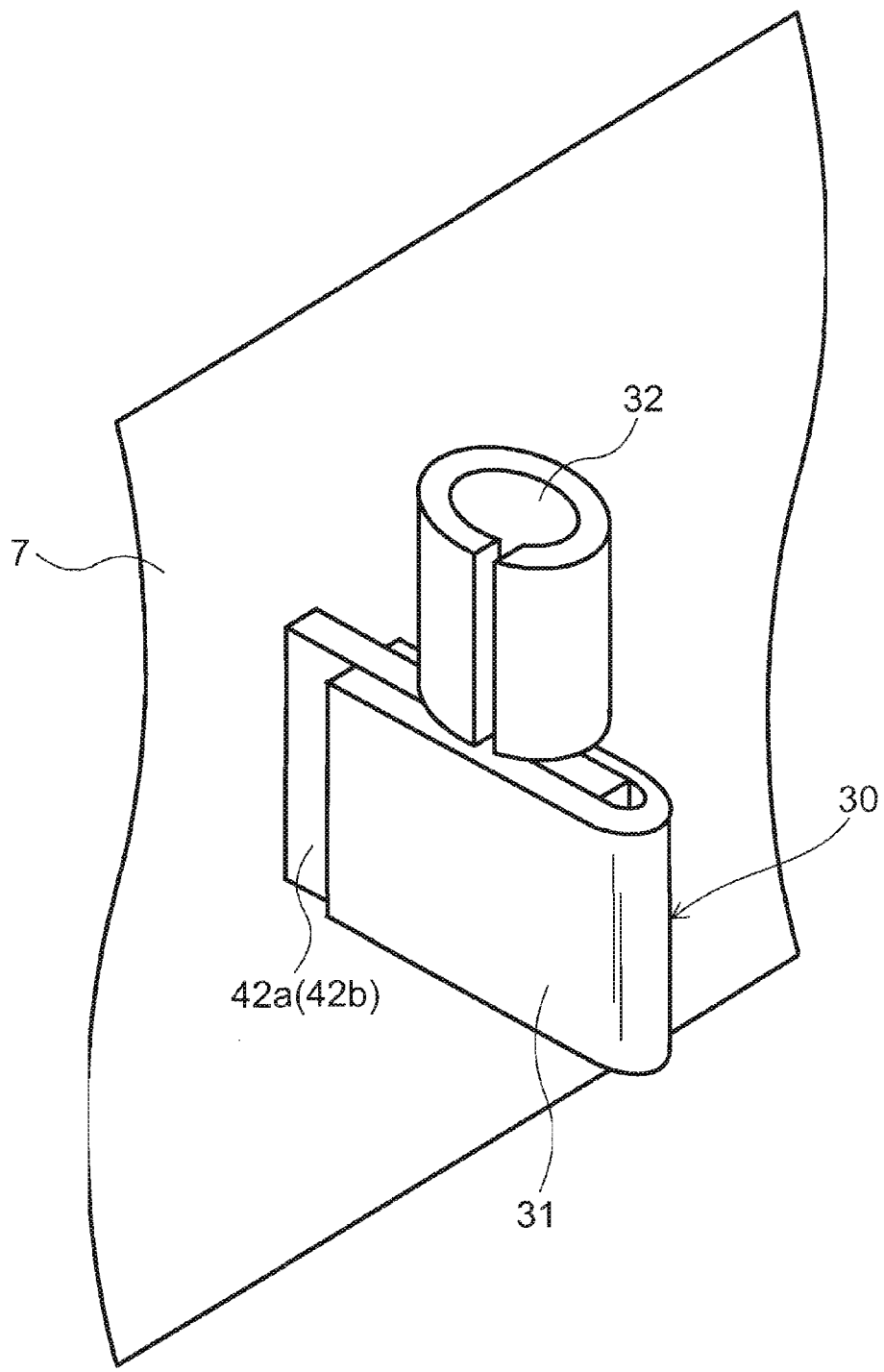
FIG. 5 is a schematic view showing a connection portion of an electrode member of the heater unit and a cable for outside connection.

FIG. 5 schematically shows a state in which a connecting member 30 is attached to each of the terminal portions 42a and 42b.

The connecting member 30 is made of a conductive material having an attachment portion 31 and a cable insertion portion 32. The attachment portion 31 is half-folded to clamp the tip portion of the terminal portion 42a or 42b and is attached to the tip portion of the terminal portion 42a or 42b, and the cable insertion portion 32 is provided integrally with an upper end portion of the attachment portion 31 and has a C-shaped cross section.

One end of the cable 50 shown in FIG. 1 is inserted into the cable insertion portion 32. By pressing the cable insertion portion 32 in the direction of decreasing diameter, the one end of the cable 50 is fixed to the cable insertion portion 32. The cable 50 is formed by covering a conductor wire with a covering material made of, for example, resin. In a portion of the cable 50 which is fixed to the cable insertion portion 32, at least a part of a tip portion of the conductor wire is exposed from the covering material to be in contact with the cable insertion portion 32. This allows the cables 50 to supply power to the electrode planes of the heater elements 20 in the tubes 11 via the connecting members 30 and the terminal portions 42a and 42b of the electrode members 40a and 40b.

Figure 9:
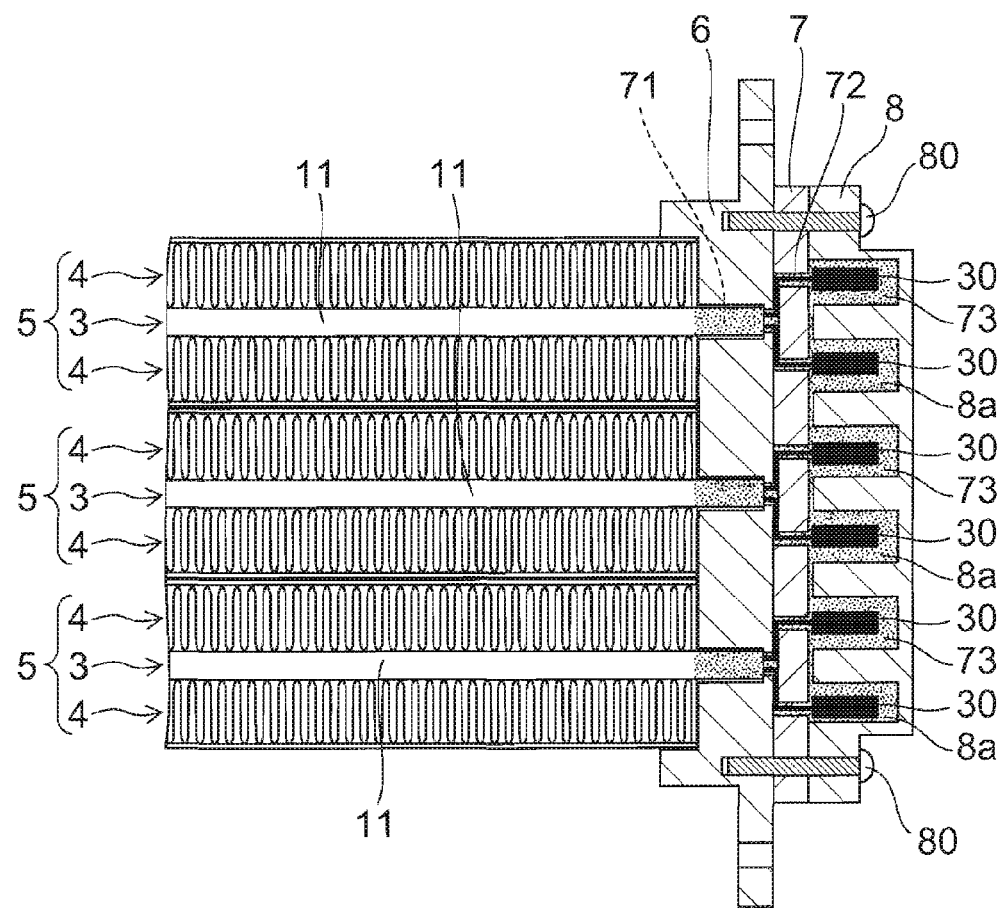
FIG. 9 is a schematic view showing a state in which an outer cap is mounted with respect to the state of FIG. 8.

After the aforementioned connecting members 30 are attached to the terminal portions 42a and 42b, respectively, an outer cap 8 is mounted on the second inner cap 7 as shown in FIG. 9. Before the outer cap 8 is mounted, an electrically-insulating and water-resistant encapsulating material 73 is applied in advance to the inside of the outer cap 8. Then, with the encapsulating material 73 contained inside, the outer cap 8 is mounted to cover an end face of the second inner cap 7.

The first inner cap 6, the second inner cap 7, and the outer cap 8 described above are fastened together with screws 80 screwed in from the outer cap 8 side as shown in FIG. 9. The terminal portions 42a and 42b protruding from the end face of the second inner cap 7 and the connecting members 30 attached to the terminal portions 42a and 42b are housed in the outer cap 8. At this time, since the encapsulating material 73 is applied in advance to the inside of the outer cap 8 as described previously, the terminal portions 42a and 42b and the connecting members 30 are located inside the outer cap 8 in a state of being covered with the encapsulating material 73, thus being waterproof-sealed. At this time, the outer cap 8 is pressed against the second inner cap 7 by the fastening force of the screws 80, and the encapsulating material 73 contained inside the outer cap 8 is also pressed toward the second inner cap 7. Accordingly, the terminal portions 42a and 42b and the connecting members 30 can be reliably covered with the encapsulating material 73 without any clearance made.

The outer cap 8 has cut-away portions 8a formed therein, the number of which corresponds to the number of the terminal portions 42a and 42b. The connecting members 30 are exposed outside via the cut-away portions 8a to be connected to the cables 50 shown in FIG. 1.

The on-vehicle heater according to this embodiment which is configured as described above is installed in an automobile to be used as a heater for a so-called car air-conditioner. For example, the on-vehicle heater according to this embodiment is disposed in a passage in the automobile in which a flow of air taken in from the outside or interior of the automobile is formed. Specifically, the on-vehicle heater is disposed such that air passes between the fins 21 and such that air flows in the direction penetrating the drawing plane in FIG. 1.

Power from a battery installed in the automobile is supplied to the heater elements 20 via an unillustrated control circuit, the cables 50, the connecting members 30, and the electrode members 40a and 40b. Thus, the heater elements 20 produce heat. The heat produced by the heater elements 20 is transmitted through the electrode members 40a and 40b and the insulating sheets 15, each of which is thermally conductive, to the radiating surfaces 12 of the tubes 11, and then to the fins 21 provided on the radiating surfaces 12. When air flows between the fins 21, the air is heated and then supplied to the interior of the automobile.

In this embodiment, the heater elements 20 and the electrode members 40a and 40b being in contact with the electrode planes thereof are housed in the tubes 11 enclosed by the caps 6 to 9. Also, the terminal portions 42a and 42b of the electrode members 40a and 40b, which are responsible for electrical connection to the outside, and the lead paths thereof are covered with the water-resistant encapsulating materials 71 to 73. Accordingly, these current-carrying portions are waterproof-sealed without being exposed outside.

Furthermore, the insulating sheet 15 is interposed between the tube 11 and each of the electrode members 40a and 40b. Thus, the tube 11 is insulated from the electrode members 40a and 40b. Accordingly, no current passes through the tubes 11, the fins 21, and the metal plates 22.

As described above, the on-vehicle heater according to this embodiment has a structure in which the current-carrying portions are waterproof-sealed without being exposed outside. For this reason, even when air sent to the on-vehicle heater contains rainwater, snow, grit, dust, or the like, the on-vehicle heater according to this embodiment causes no leakage of current, and thus ensures safety.

In a process for feeding encapsulating materials to the lead portions of the terminal portions 42a and 42b, if encapsulating materials are fed at once by one process, voids are likely to occur due to cure shrinkage or the like. Thus, there is a concern that perfect waterproof sealing cannot be obtained.

In this embodiment, however, as described previously, filling the insides of the tubes 11 with the encapsulating material 71, feeding the encapsulating material 72 for covering the bent portions of the terminal portions 42a and 42b and portions thereof inserted into the second inner cap 7, and feeding the encapsulating material 73 for covering the tip portions of the terminal portions 42a and 42b and the connecting members 30 within the outer cap 8 are not performed at once by one process but separately performed by three processes. This prevents voids from occurring in encapsulating material, and thus enables reliable waterproof-sealing of the above-described portions without making any clearance. This consequently prevents water and the like from infiltrating the current-carrying portions in a reliable manner, and thus high electrical insulation can be obtained.

Here, the inventors have performed a pressure cooker test under the following conditions in order to assess the insulation resistance (water resistance of waterproof-sealed portions) of the on-vehicle heater according to this embodiment.

Measurements were performed under the following ambient conditions including three sets of conditions as shown in Table 1 below: 1.5 atmospheric pressure, a temperature of 115° C., and a humidity of 90%; 1.8 atmospheric pressure, a temperature of 121° C., and a humidity of 90%; and 2.0 atmospheric pressure, a temperature of 124° C., and a humidity of 90%. With regard to test time, test specimens are left alone for 24 hours under each set of conditions. As test equipment, an insulation resistance tester 2406E made by Yokogawa Electric Corporation was used. Results of the test are shown in Table 1.

TABLE 1

| | MEASUREMENT ENVIRONMENT | | |
|---|---|---|---|
| TEST SPECIMEN | 1.5 ATMOSPHERIC PRESSURE (TEMPERATURE 115° C., HUMIDITY 90%) INSULATION RESISTANCE VALUE | 1.8 ATMOSPHERIC PRESSURE (TEMPERATURE 121° C., HUMIDITY 90%) INSULATION RESISTANCE VALUE | 2.0 ATMOSPHERIC PRESSURE (TEMPERATURE 124° C., HUMIDITY 90%) INSULATION RESISTANCE VALUE |
| NO. 1 | 75 MΩ | 27 MΩ | 18 MΩ |
| NO. 2 | 70 MΩ | 17 MΩ | 15 MΩ |
| NO. 3 | 15 MΩ | 8 MΩ | 7 MΩ |
| NO. 4 | 75 MΩ | 14 MΩ | 7 MΩ |
| NO. 5 | 75 MΩ | 13 MΩ | 7 MΩ |

In Table 1, each of test specimens Nos. 1 and 2 has a structure obtained by separately feeding the encapsulating materials 71, 72, and 73 in this order in three steps as described previously, and each of test specimens Nos. 3 to 5 has a structure obtained by feeding the encapsulating materials 71, 72, and 73 at once by one process.

For all the test specimens, the initial values of the insulation resistance value before the test were 2000 MΩ or more, and the insulation resistance values when the test specimens were left alone for 24 hours after the test were also 2000 MΩ or more in the atmosphere. As can be seen from Table 1, even the smallest insulation resistance value was 7 MΩ. The results show that insulation resistance values which would not cause problems such as a leakage of current were obtained for all test specimens and all sets of conditions. Further, for all test specimens, abnormalities including breakage, deformation, and looseness were not observed after the test.

In particular, under conditions in which atmospheric pressure and temperature are higher, test specimens Nos. 1 and 2 obtained by separately feeding in multiple steps encapsulating materials for covering the lead portions of the terminal portions 42a and 42b extending from the insides of the tubes 11 in the vicinities of the end openings thereof to the connecting members 30 have higher insulation resistance values than test specimens Nos. 3 to 5 obtained by feeding encapsulating materials at once by one process. Thus, it can be said that feeding encapsulating materials separately in multiple steps is desirable from the viewpoint of more reliably ensuring the water resistance of the lead portions.

The on-vehicle heater according to this embodiment has a structure in which multiple units are bonded and fixed to each other to form an integrated stacked structure and in which both end portions of the stacked structure are fitted into the caps 6 and 9, respectively. Accordingly, the units are firmly fixed to each other, and the on-vehicle heater is, as a whole, excellent in mechanical strength and vibration resistance. In particular, the unit can be prevented from rattling, being damaged, and being separated from each other due to vibrations during a drive on a bad road or the like.

Further, the terminal portions 42a and 42b of the electrode members 40a and 40b which are led out of the tubes 11 from the end openings of the tubes 11 are bent to pass through the inner cap 7. Accordingly, the bent portions of the terminal portions 42a and 42b restrict the movement of the inner cap 7 in the horizontal direction (direction in which the inner cap 7 is separated from the inner cap 6) and the vertical direction (direction in which the inner cap 7 deviates in the stacking direction of the units) in the drawing plane of FIG. 9. Thus, the rattling of the inner cap 7 is reduced.

As a result, the rattling of the inner cap 6 and the outer cap 8 mounted with the inner cap 7 interposed therebetween is also reduced, and thus it is possible to prevent breaks in the terminal portions 42a and 42b located in the caps, the separation of the terminal portions 42a and 42b from the connecting members 30, and the separation of the connecting members 30 from the cables 50.

Moreover, as well as reinforcing the fins 21, the metal plates 22 constituting the radiator units 4 together with the fins 21 also function as reinforcing plates for improving the mechanical strength of the entire stacked structure of the units. This also contributes to improvement in vibration resistance.

The inventors have performed a vibration test of the on-vehicle heater according to this embodiment under test conditions based on JIS D1601 Type 3, Class B, 4.5 G.

The result showed that there was no looseness in each portion and that requirements were satisfied. Evaluation criteria 5.1.1, 5.1.2, and 5.1.3 were satisfied. Evaluation criterion 5.1.1 concerns a visual check before and after the test, and is that there must not be an abnormality in appearance such as breakage, melting damage, or deformation. Evaluation criterion 5.1.2 concerns an operational check before and after the test, and is that rated current, power consumption, and inrush current measured at room temperature and rated air flow must satisfy specifications. Evaluation criterion 5.1.3 concerns a voltage drop check before and after the test, and is that the resistance and voltage drop of a harness portion measured after the test must be twice or less than those before the test.

Embodiments of the invention have been described above with reference to specific examples. However, the invention is not limited to these. Various modifications can be made thereto based on technical principles of the invention.

The above-described embodiment has employed a structure in which three heater units 5 are stacked, each of which is regarded as a unit having a structure formed by sandwiching one heating body unit 3 between two radiator units 4, i.e., a stacked structure of three heating body units 3 and six radiator units 4. However, the number of radiator units 4 in each heater unit 5 and the number of units of each kind in the entire stacked structure are not limited to the above-described numbers.

Moreover, fixation between the fins 21 and the metal plates 22, between the fins 21 and the tubes 11, and between the metal plates 22 is not limited to using an adhesive, but may be achieved by brazing, soldering, or the like.

What is claimed is:
1. An on-vehicle heater comprising:
a heating body unit including:
  a heater element;
  an electrode member overlapped in contact with the heater element;

an insulating sheet enveloping the heater element and the electrode member; and a tube housing the heater element, the electrode member and the insulating sheet enveloping the heater element and the electrode member;

a radiator unit stacked on the heating body unit;

a first cap mounted on an end portion of the heating body unit; and a second cap mounted to the first cap;

the electrode member having a terminal portion led out of the tube from an end opening of the tube and bent, and a bent portion of the terminal portion being interposed between the first cap and the second cap and passing through a through-hole formed in the second cap to be caused to pass through a lead path bent in accordance with a bent shape of the terminal portion.

2. The on-vehicle heater according to claim 1, wherein the terminal portion is bent at an approximately right angle from a portion of the terminal portion interposed between the first cap and the second cap toward a portion of the terminal portion passing through an interior of the second cap.

3. The on-vehicle heater according to claim 1, wherein the terminal portion is covered with an encapsulating material having electrical insulation and water resistance.

4. The on-vehicle heater according to claim 1, wherein the encapsulating material having electrical insulation and water resistance is filled in an interior of the tube in a vicinity of the end opening from which the terminal portion is led out.

5. The on-vehicle heater according to claim 1, wherein the heater element is a PTC (Positive Temperature Coefficient) ceramic element.

6. A method for manufacturing an on-vehicle heater, comprising:

stacking a heating body unit and a radiator unit, the heating body unit including a heater element, an electrode member overlapped in contact with the heater element, an insulating sheet enveloping the heater element and the electrode member, and a tube housing the heater element and the electrode member enveloped in the insulating sheet;

filling a first encapsulating material having electrical insulation and water resistance in an interior of the tube in a vicinity of an end opening, a terminal portion of the electrode member being led out from the end opening of the tube;

after the first encapsulating material being cured, bending the terminal portion and interposing a bent portion of the terminal portion between a first inner cap and a second inner cap; and mounting an outer cap having a second encapsulating material applied to an interior of the outer cap on the first and second inner caps to cover a tip of the terminal portion protruding from the first and second inner caps with the second encapsulating material, the second encapsulating material having electrical insulation and water resistance.

7. The method for manufacturing an on-vehicle heater according to claim 6, wherein after a third encapsulating material is applied to the bent portion of the terminal portion, the first and second inner caps are mounted by causing the terminal portion to pass through, the third encapsulating material having electrical insulation and water resistance.

* * * * *